United States Patent
Bühle et al.

(10) Patent No.: US 10,793,154 B2
(45) Date of Patent: Oct. 6, 2020

(54) METHOD FOR OPERATING A DRIVE TRAIN OF A MOTOR VEHICLE, AND DRIVE TRAIN MODULE OF A MOTOR VEHICLE OF THIS TYPE

(71) Applicant: ZF Friedrichshafen AG, Friedrichshafen (DE)

(72) Inventors: Felix Bühle, Eriskirch (DE); Falko Platzer, Friedrichshafen (DE); Thomas Lemp, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 64 days.

(21) Appl. No.: 16/095,200

(22) PCT Filed: Mar. 22, 2017

(86) PCT No.: PCT/EP2017/056858
§ 371 (c)(1),
(2) Date: Oct. 19, 2018

(87) PCT Pub. No.: WO2017/182223
PCT Pub. Date: Oct. 26, 2017

(65) Prior Publication Data
US 2019/0143976 A1    May 16, 2019

(30) Foreign Application Priority Data
Apr. 21, 2016 (DE) .................. 10 2016 206 735

(51) Int. Cl.
*B60W 30/18* (2012.01)
*B60W 30/184* (2012.01)
*F16H 59/68* (2006.01)

(52) U.S. Cl.
CPC .... *B60W 30/18027* (2013.01); *B60W 30/184* (2013.01); *F16H 59/68* (2013.01);
(Continued)

(58) Field of Classification Search
CPC .......... B60W 30/18027; B60W 30/184; B60K 6/387
See application file for complete search history.

(56) References Cited

U.S. PATENT DOCUMENTS

| 7,744,502 B2 | 6/2010 | Dreibholz et al. |
| 8,834,319 B2 | 9/2014 | Nefcy |

(Continued)

FOREIGN PATENT DOCUMENTS

| DE | 102006018058 A1 | 11/2007 |
| DE | 102009054468 A1 | 6/2011 |

(Continued)

OTHER PUBLICATIONS

German Search Report DE102016206735.4 dated Feb. 9, 2017. (9 pages).

(Continued)

*Primary Examiner* — Derek D Knight
(74) *Attorney, Agent, or Firm* — Dority & Manning, P.A.

(57) ABSTRACT

A method for operating a drive train of a motor vehicle, the drive train having at least one transmission (2) for carrying out different transmission gear ratios between an input shaft (21) and an output shaft (22) of the transmission (2) by selectively engaging hydraulically actuatable shift elements of the transmission (G), the drive train further having an electric machine as a drive source (1), and a hydraulically actuatable or bridgeable starting component (3) in the power path between the drive source (1) and the output shaft (22). The method includes performing a starting process of the motor vehicle driven solely by the drive source (1) with an engaged or bridged starting component (3). The method further includes limiting a drive source torque (1t) during the
(Continued)

starting process to a maximum value dependent on a current system pressure ($2p$) of a hydraulic system of the transmission (2).

8 Claims, 4 Drawing Sheets

(52) U.S. Cl.
CPC ............... *B60W 2510/0291* (2013.01); *B60W 2510/1005* (2013.01); *B60W 2510/107* (2013.01); *B60W 2510/1075* (2013.01); *B60W 2710/0666* (2013.01); *B60W 2710/083* (2013.01); *F16H 2059/6861* (2013.01)

(56) References Cited

U.S. PATENT DOCUMENTS

| | | | |
|---|---|---|---|
| 9,180,868 | B2 | 11/2015 | Yoshida et al. |
| 9,283,955 | B2 | 3/2016 | Nedorezov et al. |
| 9,937,913 | B2 | 4/2018 | Wang et al. |
| 2009/0118083 | A1 | 5/2009 | Kaminsky et al. |
| 2010/0022346 | A1 | 1/2010 | Shibata et al. |
| 2012/0238404 | A1 | 9/2012 | Schiele et al. |
| 2015/0066264 | A1 | 3/2015 | Wang et al. |
| 2015/0246669 | A1* | 9/2015 | Wang .............. B60W 30/18136 701/22 |

FOREIGN PATENT DOCUMENTS

| | | |
|---|---|---|
| DE | 102013104263 A1 | 11/2013 |
| DE | 102013104519 A1 | 11/2013 |
| DE | 112012003350 T5 | 4/2014 |
| DE | 102014217146 A1 | 3/2015 |
| EP | 2055602 A2 | 5/2009 |
| WO | 2008/111541 A2 | 9/2008 |

OTHER PUBLICATIONS

International Search Report (English Translation) PCT/EP2017/056858, dated Jun. 9, 2017. (2 pages).

* cited by examiner

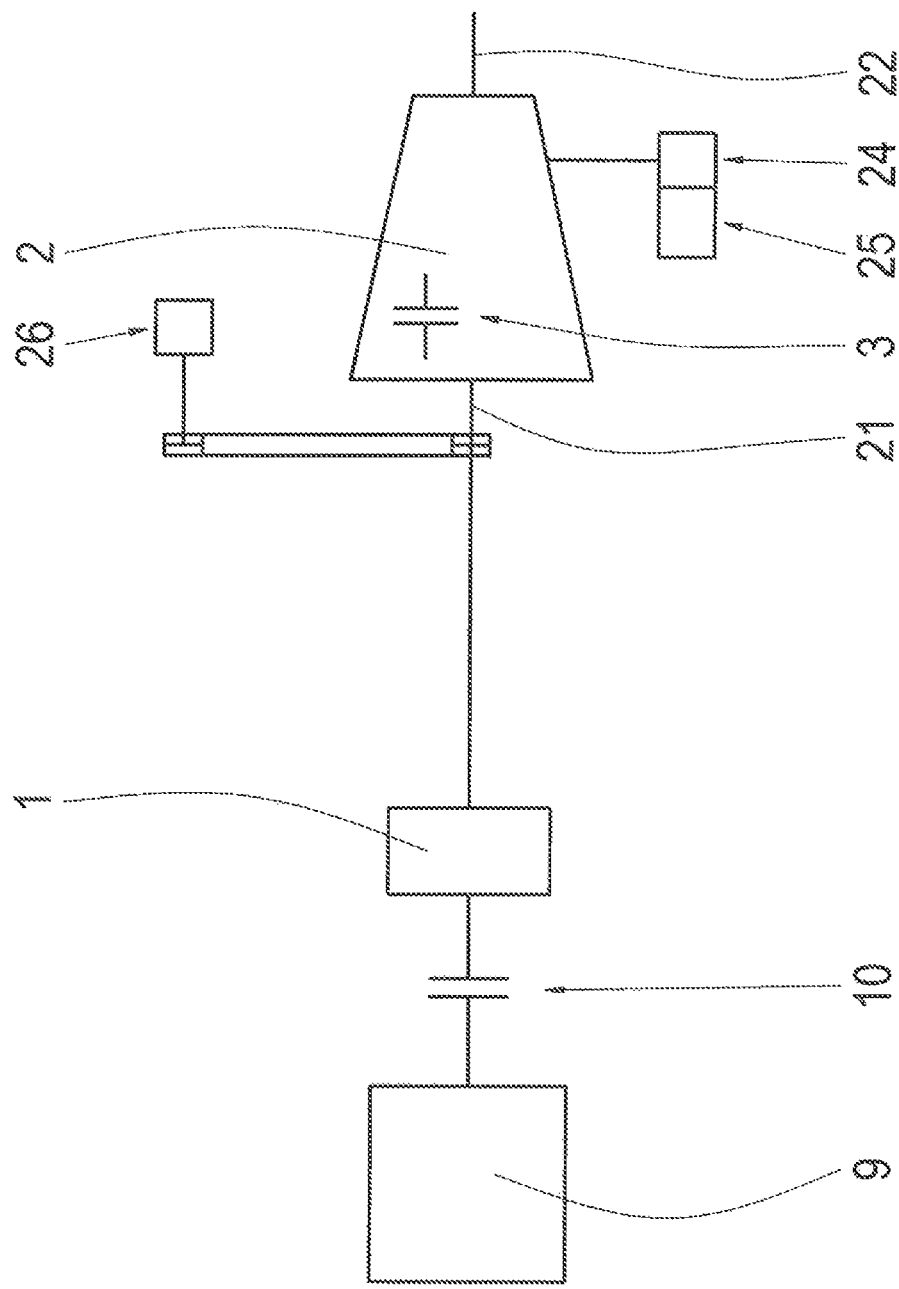

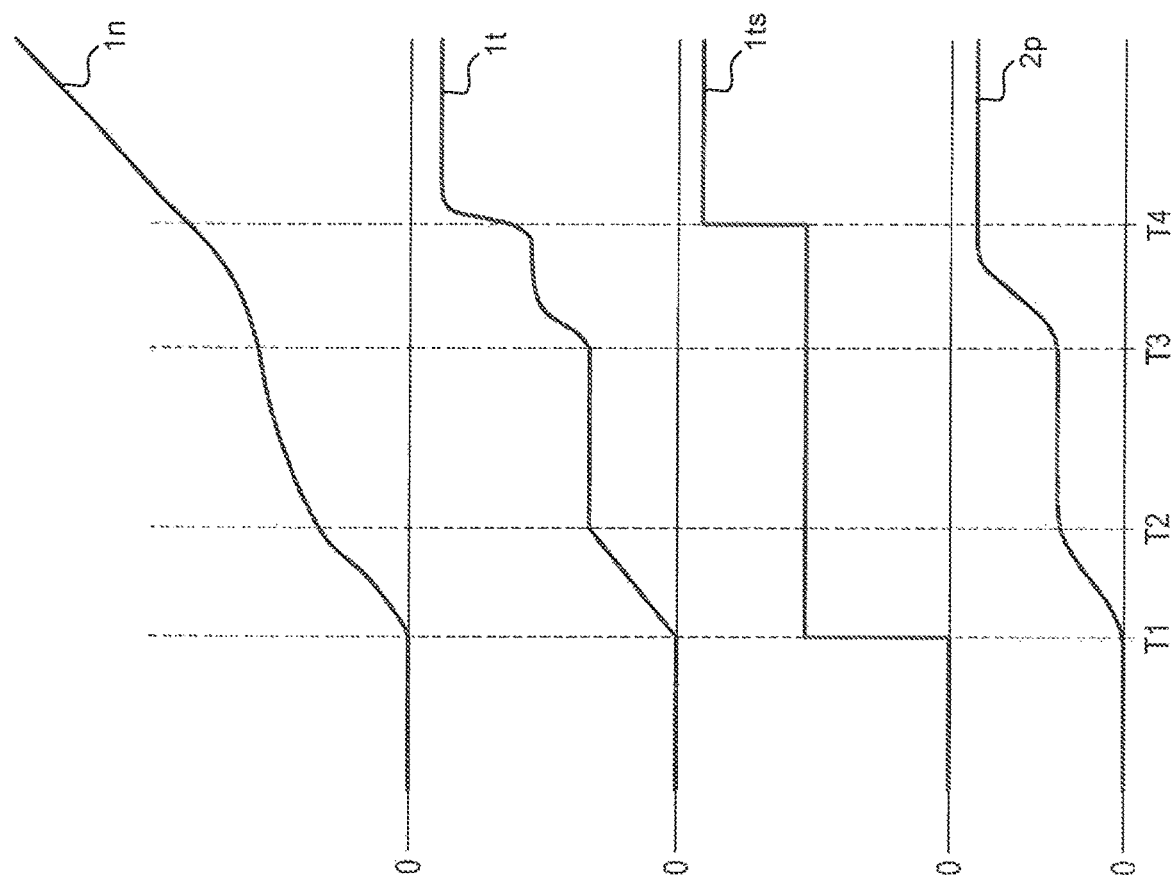

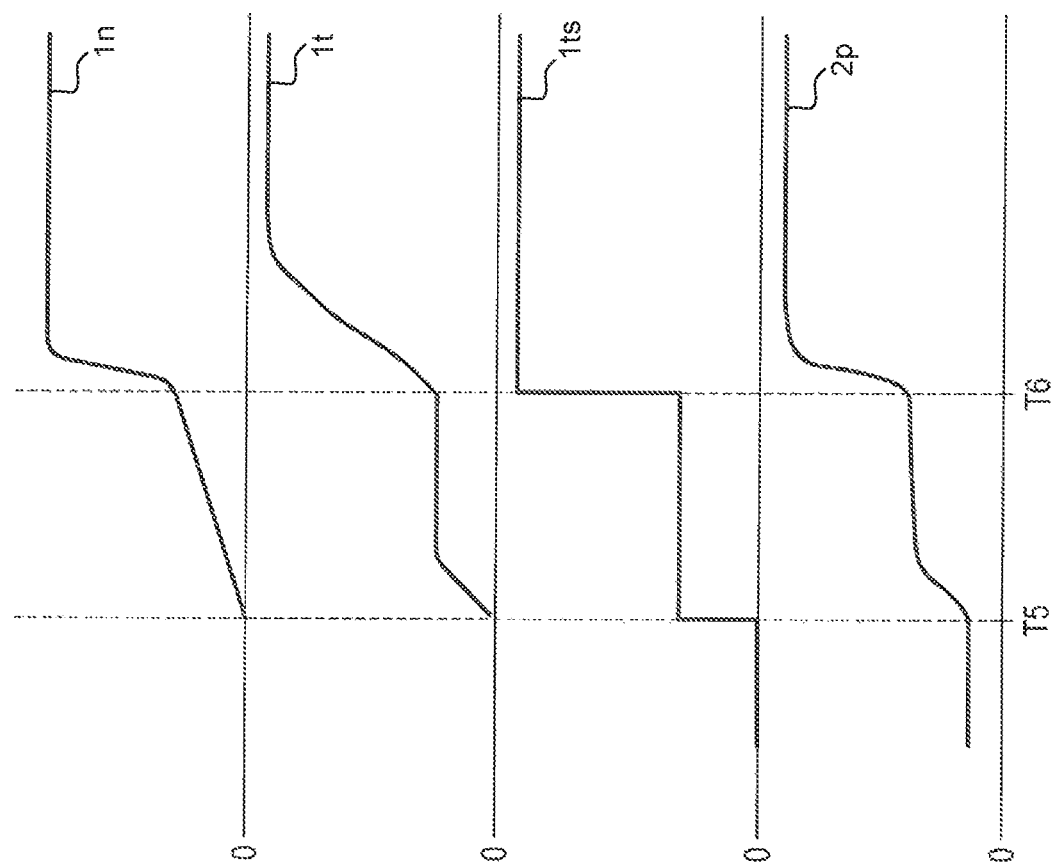

METHOD FOR OPERATING A DRIVE TRAIN OF A MOTOR VEHICLE, AND DRIVE TRAIN MODULE OF A MOTOR VEHICLE OF THIS TYPE

FIELD OF THE INVENTION

The invention relates generally to a method for operating a drive train of a motor vehicle, and to a drive train module of such a motor vehicle.

BACKGROUND

The drive train of a conventional motor vehicle having an internal combustion engine as the sole drive source usually includes a starting component in the power flow between the drive source and the driving wheels to enable a starting process of the motor vehicle. Examples of such a starting component are hydrodynamic torque converters or friction clutches. The drive train of a motor vehicle having an electric motor as the sole drive source generally does not require a starting component, since the electric motor can accelerate the vehicle from a standstill.

The drive train of a parallel hybrid vehicle usually requires a starting component, provided a starting process is to take place also solely with the aid of the internal combustion engine. Different variants of the electric starting operation of a motor vehicle having a parallel hybrid drive train are known from the related art. Unexamined patent application DE 10 2006 018 058 A1, which belongs to the applicant, discloses different types of starting processes for a motor vehicle having a parallel hybrid drive train. Represented in FIG. 4 of the unexamined patent application are time sequences during a purely electrically driven starting process with a torque converter lockup clutch in slip operation, and in FIG. 5 of the unexamined patent application with an engaged torque converter lockup clutch.

A starting process with an engaged or locked-up starting component is particularly energy-efficient, since none of the energy applied with the aid of the drive source is lost in a slip operation between the drive source and the driving wheels. In the case of a high starting torque, the starting component or its lock-up may, however, suddenly break loose. When a hydrodynamic torque converter is utilized as the starting component, this can result in a sudden increase in the output torque, which is not comprehensible for the driver of the motor vehicle. When a friction clutch is utilized as the starting component, a sudden breaking-loose results in a sharp increase in the rotational speed of the drive source. This can undesirably influence a closed-loop control or open-loop control based on the drive sources. In addition, an increase in rotational speed of this type can be perceived as acoustically uncomfortable.

The problem addressed by the invention is therefore that of providing a method for operating a drive train, by which an energy-efficient starting operation is ensured, simultaneously with a high level of comfort and reliability in service.

SUMMARY OF THE INVENTION

In one embodiment, the method is suitable for operating a motor vehicle drive train which has at least one drive source, as the at least one drive source being an electric machine, a transmission for providing different transmission gear ratios between an input shaft and an output shaft of the transmission, and a starting component in the power flow between the drive source and the output shaft. The electric machine is the sole drive source in the drive train or interacts with an internal combustion engine in a hybrid drive train. The starting component is arranged outside or inside the transmission. The implementation of the different transmission gear ratios of the transmission, as well as the engagement or the lock-up of the starting component, take place by a selective activation of hydraulically actuatable shift elements.

In a starting process driven solely by the drive source with an engaged or locked-up starting component, the drive source torque is limited, according to the invention, to a maximum value. The maximum value is dependent on the current system pressure of a hydraulic system of the transmission in this case. System pressure is considered to be the pressure which is made available to various hydraulic consumers of the transmission by a pressure supply. If this system pressure is low, the risk of an unintentional starting component slip is greater. This applies, in particular, to hydraulically actuated, force-locking elements in the power path between the drive source and the output shaft. When a system pressure is low, there is a risk of an unintentional disengagement in the power path between the drive source and the output shaft, however, even when form-fit elements are utilized. When system pressure is increasing, there is more force available to maintain the engagement or lock-up of the starting component and of the shift elements in the power path between the input shaft and the output shaft. Due to the limitation of the drive source torque as a function of the system pressure, a sudden breaking-loose of the starting component or its torque converter lockup clutch is effectively prevented.

Preferably, the maximum value of the drive source torque is dependent not only on the system pressure, but also on the gear ratio engaged in the transmission. This is the case because the power transmission capacity available at the same system pressure can vary between the shift elements of the transmission. By taking the currently engaged gear ratio into account, the maximum drive source torque is selected to be higher, for example, when the power transmission capacity of the shift elements involved in the current gear ratio permit this.

Preferably, the maximum value of the drive source torque is dependent, not only on the system pressure, but also on the temperature of a hydraulic fluid of the transmission. This is the case because the power transmission capacity of frictional shift elements decreases at high temperatures. The protection against slip is therefore enhanced by taking the temperature into account. The temperature of the hydraulic fluid is ascertained, for example, in the sump of the hydraulic system with the aid of a suitable sensor.

According to one preferred embodiment, the maximum value of the drive source torque is dependent not only on the system pressure, but also on the temperature of at least one shift element of the transmission. The shift element is also the starting component in this case. An even more precise limitation of the starting torque is possible as a result. The determination takes place either with the aid of a suitable temperature sensor or with the aid of a temperature model of the shift element, which computationally determines the temperature with reference to various input parameters.

According to one possible version, the transmission includes a first pump and a second pump. The first pump is drivable by the drive source in this case. The second pump is drivable independently of the drive source, for example, with the aid of a separate electric motor. The first and the second pumps are configured for supplying pressure to the shift elements of the transmission and of the starting component or its lock-up. The output pressure of each of the two pumps is determined by a pressure model. The higher of the two output pressures is utilized as the current system pressure for limiting the drive source torque. As a result, expensive pressure sensors are omitted.

Preferably, the starting component is transferred into a slip state when the specified drive torque of the motor vehicle reaches or exceeds the current maximum value utilized for limiting the drive source torque. If the driver of the motor vehicle demands a high drive torque, for example, by an appropriate actuation of the accelerator pedal, a limitation of the drive torque is not comprehensible for the driver. The transfer of the starting component from the engaged or locked-up condition into the slip state takes place, in this case, by a targeted pressure control of the starting component or its lock-up, whereby a gentle transition is achievable. In parallel therewith, the rotational speed of the drive source is increasable. As a result, the transfer into the slip operation is accelerated. In addition, the pump driven by the drive source is now operated at a higher rotational speed, whereby the system pressure is increasable.

In addition to the method according to the invention, a drive train module of a motor vehicle is also provided, which includes at least one drive source, the at least one drive source being an electric machine, an interface to an internal combustion engine of the motor vehicle, a control unit, a transmission for providing different transmission gear ratios between an input shaft and an output shaft of the transmission, a hydraulically actuatable or bridgeable starting component in the power path between the drive source and the output shaft, and a pump, which is drivable independently of the drive source with the aid of a separate electric pump drive, for the hydraulic pressure supply of the transmission. In this case, the control unit is configured for controlling the above-described method by an open-loop system.

BRIEF DESCRIPTION OF THE DRAWINGS

Exemplary embodiments of the invention are described in detail in the following with reference to the attached figures. Components that are the same or similar are labeled using the same reference characters. In the figures, the following is shown:

FIG. 2 shows a schematic view of a parallel hybrid drive train having a starting component integrated in the transmission;

FIG. 3 shows a time sequence of various variables of the drive train; and

FIG. 4 shows a time sequence of the variables represented in FIG. 3 during a starting process with an initially engaged or locked up starting component.

DETAILED DESCRIPTION

Figure 1:
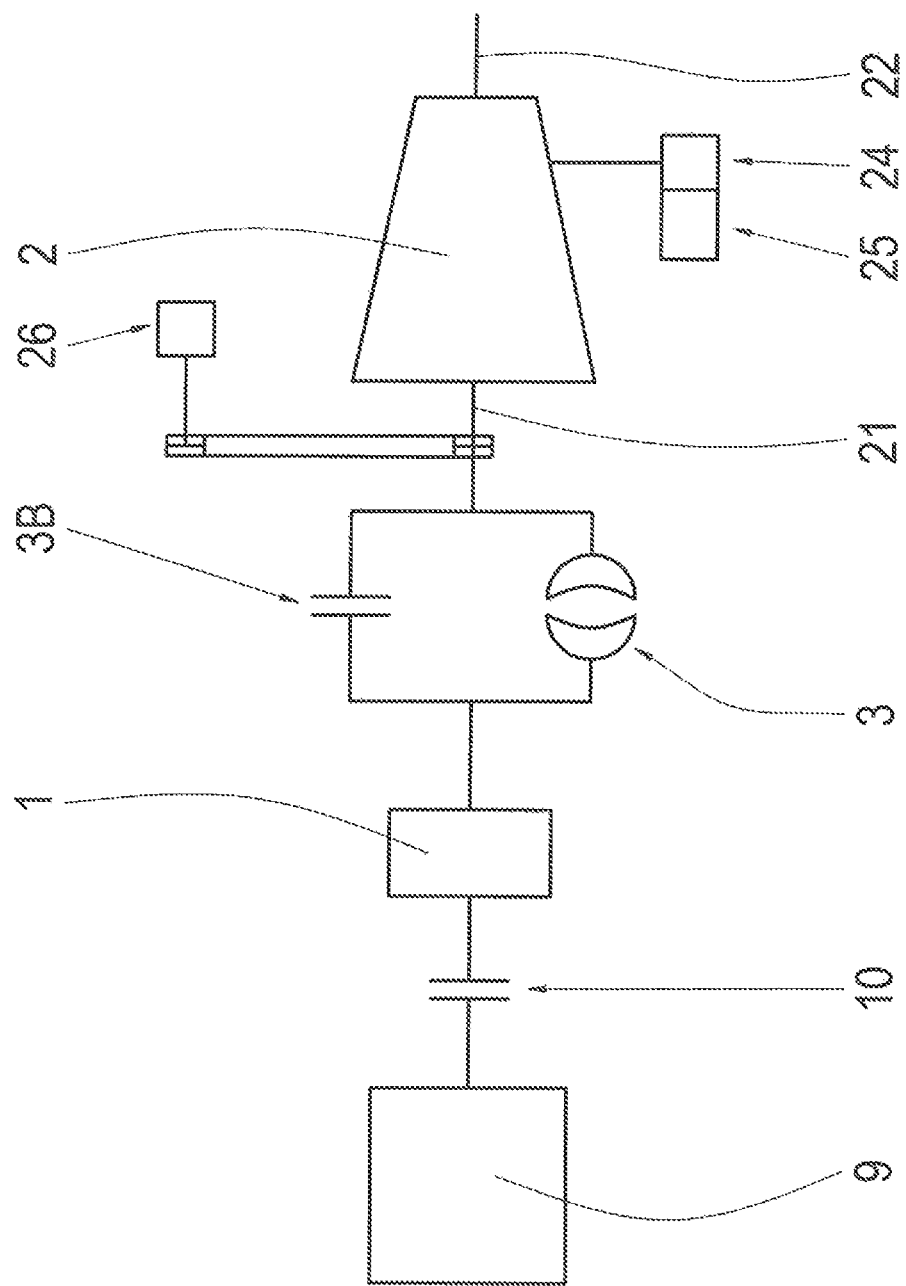
FIG. 1 shows a schematic view of a parallel hybrid drive train having a hydrodynamic torque converter as a starting component.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a drive train of a motor vehicle, as the drive train being a parallel hybrid drive train. The drive train has an internal combustion engine 9 and a drive source 1, the drive source 1 being an electric machine, wherein a separating clutch 10 is connected between the internal combustion engine 9 and the electric machine 1. The drive train from FIG. 1 further includes a transmission 2 including an input shaft 21, an output shaft 22, and a starting component 3, wherein the starting component 3 is connected between the electric machine 1 and the input shaft 21. The starting component 3 is a hydrodynamic torque converter which is able to be locked up by a torque converter lockup clutch 3B which is connected in parallel. The output shaft 22 is drivingly connected to driving wheels of the motor vehicle.

To start a motor vehicle equipped with the drive train from FIG. 1 solely with the electric machine 1, the torque converter is in slip or is locked up via the engaged torque converter lockup clutch 3B. In a starting process with a slipping torque converter, the electric machine 1 has any rotational speed while the output shaft 22 stands still, for example, by an actuation of a service brake of the motor vehicle. In a starting process with an engaged torque converter lockup clutch 3B, the rotational speeds of the electric machine 1 and the output shaft 22 are coupled by the transmission gear ratio selected in the transmission 2.

A first pump 26, which is driven by the input shaft 21 with a chain drive, is available for supplying oil pressure to the transmission 2. If the input shaft 21 is at rest, however, the first pump 26 cannot provide oil pressure. A second pump 24, which is drivable with a separate electric pump drive 25, is provided for this purpose. This is to be considered merely as an example. Alternatively, it would be possible to provide the first pump 26 with a separate electric drive, by which the first pump 26 is drivable independently of the input shaft 21. In order to avoid the situation in which this separate electric drive drives the input shaft 21, a free-wheel unit or a shift element is providable in the operative connection between the input shaft 21 and the first pump 26.

FIG. 2 shows a schematic view of a drive train of a motor vehicle, the drive train being a parallel hybrid drive train, wherein the starting component 3 is now integrated into the transmission 2. The starting component 3 is, for example, one of the shift elements which contributes to the formation of the transmission gear ratios of the transmission 2. The electric machine 1 is fixedly connected to the input shaft 21. The output shaft 22 is drivingly connected to driving wheels of the motor vehicle. The oil pressure supply of the transmission 2 corresponds to the embodiment according to FIG. 1, and so reference is made to the comments made with respect to FIG. 1.

To start a motor vehicle equipped with the drive train from FIG. 2 is solely with the electric machine 1, the starting component 3 is in slip or is engaged. In a starting process with a slipping starting component 3, the electric machine 1 has any rotational speed while the output shaft 22 stands still, for example, by an actuation of a service brake of the motor vehicle. In a starting process with an engaged starting component 3, the rotational speeds of the electric machine 1 and the output shaft 22 are coupled by the transmission gear ratio selected in the transmission 2.

As a result, when travel takes place purely electrically with the drive train according to FIG. 1 or FIG. 2, the internal combustion engine 9 is typically shut down and the separating clutch 10 connected between the internal combustion engine 9 and the electric machine 1 is completely disengaged. In hybrid operation, on the other hand, in which the internal combustion engine 9 as well as the electric machine 1 are running and provide drive torque, the separating clutch 10 connected between the internal combustion engine 9 and the electric machine 1 is engaged.

The operation of the internal combustion engine 9 is controlled by an open-loop and/or closed-loop control by an engine control unit and the operation of the transmission 2 is controlled by an open-loop and/or closed-loop control by a transmission control unit. A hybrid control unit is typically provided for the open-loop or closed-loop control of the operation of the electric machine 1. The starting component 3 or the torque converter lockup clutch 3B is controlled by an open-loop and/or closed-loop control by a starting component control unit.

Typically, the starting component control unit and the transmission control unit are implemented in a shared control unit, namely in a transmission control unit device. In some embodiments, the hybrid control unit is also an integral part of the transmission control unit device. The engine control unit is typically an integral part of a separate control unit, namely an engine control unit device. The engine control unit device and the transmission control unit device exchange data with one another.

FIG. 3 shows the time sequence of various variables of the drive train, including a rotational speed 1n of the electric machine 1, a torque 1t of the electric machine 1, a specified drive torque 1ts, and a system pressure 2p of the hydraulic system of the transmission 2. At the point in time T1, the driver of the motor vehicle actuates the accelerator pedal and, therefore, demands a specified drive torque 1ts greater than zero. At this point in time T1, a gear ratio is engaged in the transmission 2, the starting component 3 is engaged or locked up, and the system pressure 2p is already at a low level due to the operation of the second pump 24. Now the torque 1t of the electric machine 1 is increased, and so its rotational speed 1n increases. The system pressure 2p also increases. At the point in time T2, the system pressure 2p cannot be further increased, and so the torque 1t is also limited to a value. In the present example, this value is less than the demanded specified drive torque 1ts. At the point in time T3, the rotational speed 1n reaches a limiting value, and so the first pump 26 provides a higher pressure. As a result, the system pressure 2p continues to increase, and so a higher torque 1t is now released. At the point in time T4, the driver increases the specified drive torque 1ts. At this point in time, the system pressure 2p is already high enough, and so the torque 1t is further increased.

FIG. 4 shows a time sequence of the variables represented in FIG. 3 during a starting process with an initially engaged or locked up starting component 3. At the point in time T5, the driver of the motor vehicle actuates the accelerator pedal and, therefore, demands a specified drive torque 1ts greater than zero. At this point in time T5, a gear ratio is engaged in the transmission 2, and the system pressure 2p is already at a low level due to the operation of the second pump 24. The starting component 3 is engaged or locked up. Now the torque 1t of the electric machine 1 is increased, and so its rotational speed 1n increases. The system pressure 2p also increases. The system pressure 2p is high enough in this case for the torque 1t to reach the specified drive torque 1ts. At the point in time T6, the driver substantially increases the specified drive torque 1ts. The demanded torque 1ts is so high that a transmission of this torque via the engaged or locked up starting component 3 would not be possible. Therefore, the starting component 3 is transferred from the engaged or locked up condition into a slip state. The rotational speed 1n is now increased to a specified value, whereby the first pump 26 provides a higher pressure. As a result, the system pressure 2p continues to increase, and so a higher torque 1t is now released, which corresponds to the specified drive torque 1ts.

Modifications and variations can be made to the embodiments illustrated or described herein without departing from the scope and spirit of the invention as set forth in the appended claims.

REFERENCE CHARACTERS 1 drive source
1t torque of the drive source
1ts specified drive torque
1n rotational speed of the drive source
2 transmission
21 input shaft
22 output shaft
24 second pump
25 pump drive
26 first pump
2p system pressure
3 starting component
3B torque converter lockup clutch
9 internal combustion engine
10 separating clutch
A selection

The invention claimed is:

1. A method for operating a drive train of a motor vehicle, the drive train having at least one transmission (2), the transmission (2) configured such that different gear ratios between an input shaft (21) and an output shaft (22) of the transmission (2) are made available by selectively engaging hydraulically actuatable shift elements of the transmission (G), the drive train further having an electric machine as a drive source (1) and a hydraulically actuatable or bridgeable starting component (3) in a power path between the drive source (1) and the output shaft (22) of the transmission (G), the method comprising:
performing a starting process of the motor vehicle, the starting process driven solely by the drive source (1) with the starting component (3) locked-up; and
limiting a drive source torque (1t) of the drive source (1) during the starting process to a maximum value of the drive source torque (1t), the maximum value of the drive source torque (1t) being dependent on a current system pressure (2p) of a hydraulic system of the transmission (2).

2. The method of claim 1, wherein the maximum value of the drive source torque (1t) is additionally dependent on a gear ratio engaged in the transmission (2).

3. The method of claim 1, wherein the maximum value of the drive source torque (1t) is additionally dependent on a temperature of a hydraulic fluid of the transmission (2).

4. The method of claim 1, wherein the maximum value of the drive source torque (1t) is additionally dependent on a temperature of a shift element (3x) of the transmission (2).

5. The method of claim 1, wherein the transmission (2) includes a first pump (26) drivable by the drive source (1) and a second pump (24) drivable independently of the drive source (1), the first and the second pumps (26, 24) are configured for supplying pressure to the shift elements and the starting component (3) or to the shift elements and a lock-up clutch of the starting component (3), the method further comprising:

determining an output pressure of the first pump (26) with a first pressure model, and an output pressure of the second pump (24) with a second pressure model; and utilizing the greater of the output pressure of the first pump (26) and the output pressure of the second pump (24) as the current system pressure for limiting the drive source torque (1*t*).

6. The method of claim 1, wherein the starting component (3) is transferred into a slip state when the drive source torque (1*t*) of the motor vehicle reaches or exceeds the current maximum value of the drive source torque (1*t*).

7. The method of claim 6, wherein a rotational speed of the drive source (1) is increased in parallel with the transfer of the starting component (3) into the slip state.

8. A drive train module of a motor vehicle, comprising:
at least one drive source (1), the at least one drive source (1) being an electric machine;
an interface to an internal combustion engine (9) of the motor vehicle;
a control unit;
a transmission (G) configured for providing different gear ratios between an input shaft (21) and an output shaft (22) of the transmission (2) by the selective engagement of hydraulically actuatable shift elements of the transmission (G); and
a hydraulically actuatable or bridgeable starting component (3) in a power path between the drive source (1) and the output shaft (22) of the transmission (G),
wherein the control unit is configured for, by an open-loop control system,
performing a starting process of the motor vehicle, the starting process driven solely by the drive source (1) with the starting component (3) locked-up, and
limiting a drive source torque (1*t*) of the drive source (1) during the starting process to a maximum value of the drive source torque (1*t*), the maximum value of the drive source torque (1*t*) being dependent on a current system pressure (2*p*) of a hydraulic system of the transmission (2).

\* \* \* \* \*